United States Patent
Barlier et al.

(10) Patent No.: US 12,083,711 B2
(45) Date of Patent: Sep. 10, 2024

(54) ADDITIVELY MANUFACTURED MOLD WITH A SENSOR

(71) Applicants: COMMISSARIAT A L'ENERGIE ATOMIQUE ET AUX ENERGIES ALTERNATIVES, Paris (FR); CIRTES SRC, Saint-Die-des-Vosges (FR)

(72) Inventors: Claude Barlier, Saint-die-des-Vosges (FR); Manuel Fendler, Grenoble (FR); Cyril Pelaingre, Saint-Die-des-Vosges (FR)

(73) Assignees: COMMISSARIAT A L'ENERGIE ATOMIQUE ET AUX ENERGIES ALTERNATIVES, Paris (FR); CIRTES SRC, Saint-Die-des-Vosges (FR)

( * ) Notice: Subject to any disclaimer, the term of this patent is extended or adjusted under 35 U.S.C. 154(b) by 337 days.

(21) Appl. No.: 17/286,283

(22) PCT Filed: Oct. 18, 2019

(86) PCT No.: PCT/FR2019/052482
§ 371 (c)(1),
(2) Date: Apr. 16, 2021

(87) PCT Pub. No.: WO2020/079381
PCT Pub. Date: Apr. 23, 2020

(65) Prior Publication Data
US 2021/0354335 A1  Nov. 18, 2021

(30) Foreign Application Priority Data
Oct. 19, 2018 (FR) ...................................... 1859685

(51) Int. Cl.
*B29C 33/30* (2006.01)
*B29C 33/38* (2006.01)
*B29C 33/40* (2006.01)

(52) U.S. Cl.
CPC ........ *B29C 33/302* (2013.01); *B29C 33/3842* (2013.01); *B29C 33/40* (2013.01)

(58) Field of Classification Search
CPC .......................... B29C 33/302; B29C 33/3842
See application file for complete search history.

(56) References Cited

U.S. PATENT DOCUMENTS 6,627,835 B1   9/2003  Chung et al.
6,745,446 B1   6/2004  Barlier
(Continued)

FOREIGN PATENT DOCUMENTS

FR    2 673 302 A1    8/1992
WO    WO 00/31599 A1   6/2000
(Continued)

OTHER PUBLICATIONS

Dankoco, Temperature sensor realized by inkjet printing process on flexible substrate, 2015, Elsevier, Materials Sciuence and Engineering B 205 (2016) 1-5 (Year: 2015).*
(Continued)

*Primary Examiner* — Xiao S Zhao
*Assistant Examiner* — Nicholas J Chidiac
(74) *Attorney, Agent, or Firm* — Oblon, McClelland, Maier & Neustadt, L.L.P.

(57) ABSTRACT

An instrumented mold formed by an assembly of strata includes, within the assembly of strata, a measurement structure provided with at least one pressure sensor and/or at least one temperature sensor or any other sensor capable of measuring a physical quantity, the structure typically being in the form of a flexible support housed between two strata.

11 Claims, 7 Drawing Sheets

(56) References Cited

U.S. PATENT DOCUMENTS

| | | | |
|---|---|---|---|
| 8,965,470 B2* | 2/2015 | Raskas | A61B 5/1455 |
| | | | 600/310 |
| 9,440,397 B1* | 9/2016 | Fly | B29C 64/171 |
| 2005/0278928 A1 | 12/2005 | Barlier et al. | |
| 2008/0196232 A1 | 8/2008 | Barlier et al. | |
| 2012/0267828 A1 | 10/2012 | Halford | |
| 2014/0367889 A1 | 12/2014 | Halford | |
| 2015/0250934 A1* | 9/2015 | Min | G05B 19/4097 |
| | | | 700/119 |
| 2018/0186110 A1* | 7/2018 | Koyanagi | B22F 3/115 |
| 2019/0217506 A1* | 7/2019 | Halford | B29C 35/045 |
| 2019/0337245 A1* | 11/2019 | Bowden, Jr. | B29C 64/10 |
| 2020/0025309 A1* | 1/2020 | Cis | F15B 21/04 |

FOREIGN PATENT DOCUMENTS

| | | |
|---|---|---|
| WO | WO 2004/034165 A1 | 4/2004 |
| WO | WO 2006/128983 A1 | 12/2006 |
| WO | WO 2011/048365 A1 | 4/2011 |
| WO | WO 2013/021195 A2 | 2/2013 |

OTHER PUBLICATIONS

International Search Report issued on Feb. 11, 2020 in PCT/FR2019/052482 filed on Oct. 18, 2019, 2 pages.

French Preliminary Search Report (with English translation of Categories of Cited Documents) issued on Jun. 27, 2019 in French Application 1859685 filed on Oct. 19, 2018, 2 pages.

Dankoco, M. D. et al., "Temperature sensor realized by inkjet printing process on flexible substrate," Materials Science and Engineering B, vol. 205, 2016, pp. 1-5.

Gräbner, D. et al., "Low-Cost Thin and Flexible Screen-Printed Pressure Sensor," Proceedings, Eurosensors, vol. 6, No. 616, 2017, pp. 1-4.

* cited by examiner

ADDITIVELY MANUFACTURED MOLD WITH A SENSOR

TECHNICAL FIELD AND PRIOR ART

The present invention pertains to the field of industrial tooling, of machine tools, of shaping of materials and of mechanical parts in general. More particularly, it relates to the molds field, in particular plastics molds for shaping polymer materials.

In a material shaping process using a mold, it is useful to be able to accurately determine the thermal cycle (temperature, rise and descent rate) to which the molded material is subjected at the receiving surface.

For this purpose, it might be desired to integrate into the mold one or several sensor(s), in particular temperature sensors, for example in the form of thermocouples, that is/are inserted into the structure of the mold by drilling.

In general, the number of drillings and, consequently, of thermocouples that could be integrated, is limited because the drillings tend to weaken the structure of the mold.

On the other hand, because most of the time the drilling can be performed only in a straight line, the sensor arrangement possibilities are generally limited.

Moreover, integrating thermocouples by drilling requires taking precautions in order not to alter some sensitive portions and in particular in order not distort the receiving surface.

Hence, arises the problem of making an instrumented mold that is improved with regards to the above-mentioned drawbacks.

DISCLOSURE OF THE INVENTION

According to one aspect, the present application relates to a mold having at least one imprint over which a material is intended to be disposed to conform to this imprint and including a material receiving surface, the mold being formed by an assembly of a plurality of strata, said mold integrating, within said strata assembly, one or several sensor(s).

A stratified mold allows integrating sensors without drilling, the sensor(s) may be integrated, in particular as of the design stage, into an inter-strata room or between two strata or over at least one stratum.

Among the sensors, there may be at least one temperature sensor and/or at least one pressure sensor. Such sensors may allow ensuring monitoring of the progress of a molding method and adapting parameters of this method according to the measurements collected by the sensor(s). Such sensors may also be used in order to ensure supervision of the structure of the mold.

According to one embodiment, said one or several sensor(s) may be integrated into an area called "detection" area of a flexible support, the detection area being arranged between at least one first stratum amongst said strata and at least one second stratum amongst said strata, said first stratum being disposed over said second stratum. Said one or several sensor(s) may be arranged beneath the material receiving surface. By means of such a flexible support, it is possible to instrument a mold with a complex topography in particular at its material receiving surface.

Advantageously, the support may be made of a polymer material.

According to a possible implementation, said one or several sensor(s) may be formed at least partially by a conductive or semiconductor ink. Thus, sensors with a limited size and which can fit easily into an inter-strata space are obtained.

In this case, said detection area may be arranged against a lower face of said first stratum, said lower face being opposite to an upper face of said first stratum, said upper face of said first stratum forming at least one region of said material receiving surface. Thus, the sensor(s) is/are placed the closest to the material receiving surface at a distance substantially corresponding to the thickness of a stratum, and which may depend on the phenomena to be observed.

Advantageously, the flexible support includes at least one so-called "connection" area integrating one or several conductive track(s) connected to said one or several sensor(s), said connection area defining a non-zero angle $\alpha$ with said detection area. Typically, said connection area extends against a lateral face of said second stratum.

Thanks to the flexibility of the support, the connection and the transfer of measurement signals towards another portion of the mold or else out of the mold is facilitated.

This connection area may extend to underneath the base of the mold, in particular when it is desired to establish a connection between the sensor(s) and an electronic device located beneath the mold.

The assembly may include a base provided with a cavity to accommodate an electronic circuit, said connection area further extending beneath said base and being arranged so as to connect at least one of said conductive tracks (to a conductive element of said electronic circuit.

The electronic circuit may be provided with at least one stage for driving one or several servovalve(s) of a fluidic network, the fluidic network being provided with one or several channel(s) extending in the strata assembly.

According to another embodiment, it is possible to provide for integrating the sensor(s) at one stratum of the assembly, for example over the upper face of a stratum. In the case where the sensor is disposed over one stratum, it may be in the form of a device printed or silk-screen printed on this stratum. Advantageously, the sensor may then be disposed and made at the surface of the stratum and without a machining of the stratum being necessarily carried out.

According to another aspect, the present application relates to a method for making a mold comprising steps consisting in:

providing a set of elementary parts each forming a stratum, assembling the elementary parts, by interposing between two strata, at least one or several sensor(s), in particular temperature and/or pressure sensors, the sensors being advantageously disposed over a flexible support such as a polymer support.

According to another aspect, the present application relates to a method for making a mold comprising steps consisting in:

providing a set of elementary parts each forming a stratum, at least one stratum being provided with one or several temperature and/or pressure sensor(s) on one face, assembling the elementary parts.

Advantageously, the temperature and/or pressure sensor(s) made directly on the stratum may be formed at surface, through a technique such as printing or silk-screen printing, which enables in particular an easy and accurate positioning of the sensor(s), implementing a small-sized detection area, not altering the stratum on which these sensors are made.

BRIEF DESCRIPTION OF THE DRAWINGS

The present invention will be better understood on reading the description of embodiments, provided for indicative and non-limiting purposes, with reference to the appended drawings wherein:

FIGS. 8A-86 serve to illustrate a connection of the support of the sensors to an electronic circuit external to the mold and which may be accommodated beneath the latter;

Furthermore, in the description hereinafter, terms that depend on the orientation of the device such as "horizontal", "vertical", "lateral", "under", "over" apply while considering that the structure is directed as illustrated in the figures.

Identical, similar or equivalent portions of the different figures bear the same reference numerals so as to facilitate switching from one figure to another.

The different portions represented in the figures are not necessarily according to an even scale, in order to make the figures more readable.

DETAILED DISCLOSURE OF PARTICULAR EMBODIMENTS

Figure 1A:
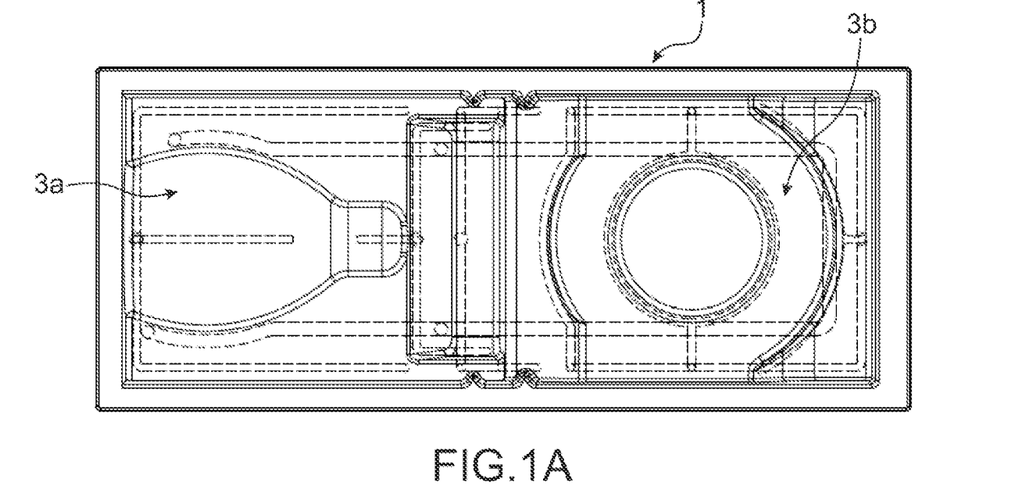
FIGS. 1A-1C serve to illustrate an example of an instrumented stratoconception mold formed by assembled strata and adapted to integrate at least one measuring sensor, in particular temperature and/or pressure sensors or any other sensor capable of measuring a physical quantity, at an inter-strata location.
Figure 1B:
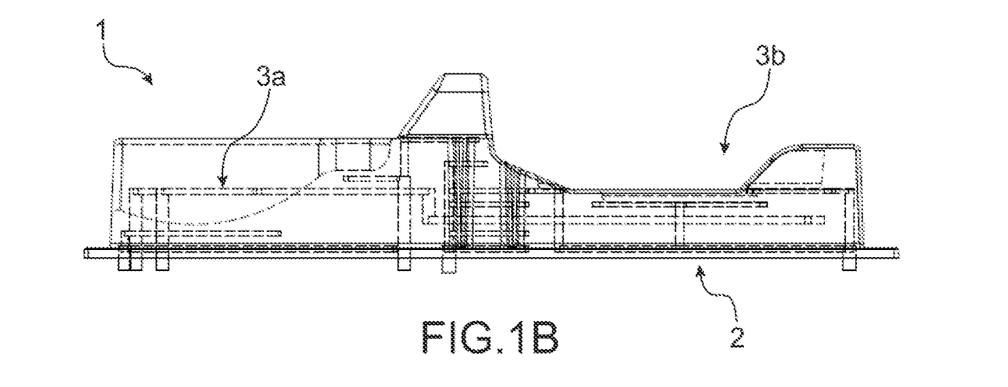
Figure 1C:
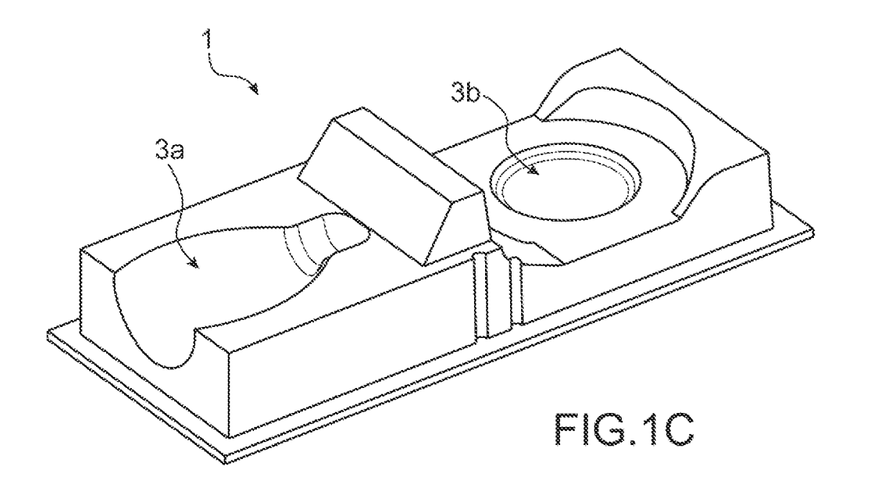

Reference is now made to FIGS. 1A-1C showing a mechanical part adapted to serve as a mold 1 and respectively represented according to a top view, a side view and a perspective view. Opposite to its base 2, the mold 1 includes at least one imprint over which a material is intended to be disposed typically in a pasty, liquid or powdery form, this material being brought to conform to this imprint by solidifying, curing or agglomerating. In this instance, the mold 1 includes at least one hollow imprint 3a, 3b with planes that are inclined with respect to its base.

According to a particular embodiment, the mold 1 may find application in the plastics industry and could enable manufacturing of elements made of a polymer material. The mold 1 may be intended to allow shaping a plastic sheet that is heated up to a temperature for example in the range of 70° before being packed on the mold 1. The mold 1 may be made of a metal, such as aluminum.

Figure 2:
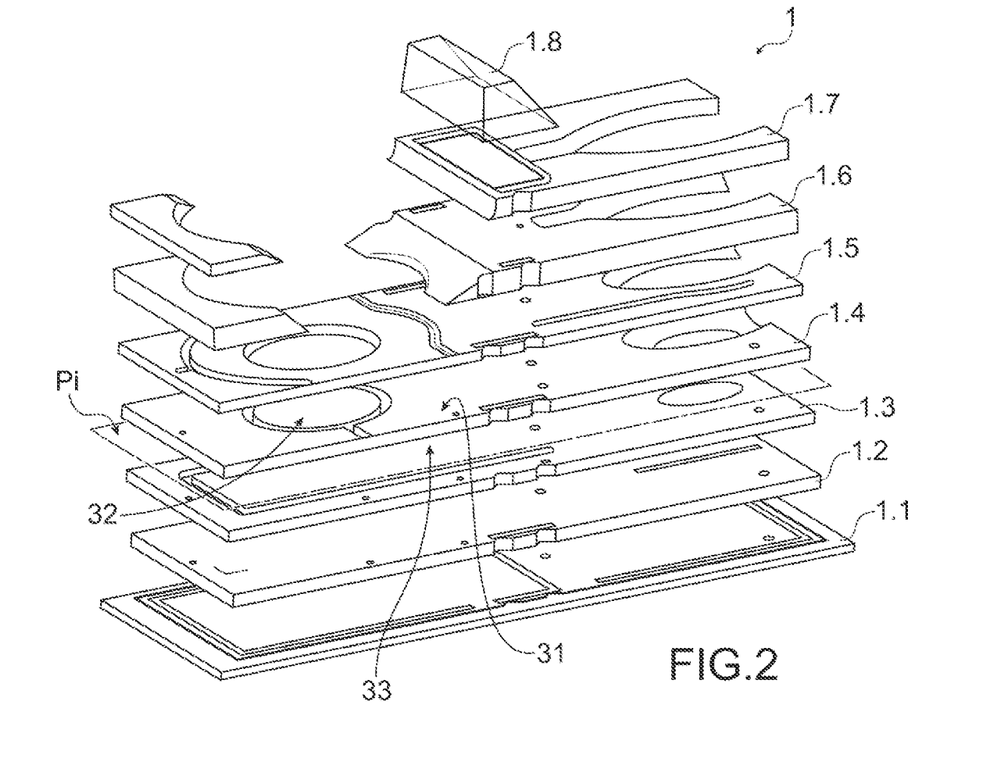
FIG. 2 provides an exploded view of the set of strata forming the instrumented mold.

In this instance, as shown in FIG. 2, the mold 1 is particular in that it is formed by an assembly of several elementary parts 1.1, 1.2, 1.3, 1.4, 1.5, 1.6, 1.7, 1.8, called "strata", which are superimposed and integrates into this assembly, one or several measuring sensor(s) (not represented in these figures). The strata 1.1, 1.2, 1.3, 1.4, 1.5, 1.6, 1.7, 1.8 may be in in the form of stacked elements with complementary shapes, some of these elements may look like a layer or a structured plate. The strata 1.1, 1.2, 1.3, 1.4, 1.5, 1.6, 1.7, 1.8 are assembled using a fastening means for example gluing or welding and/or secure holding elements such as inserts crossing the strata of the assembly and ensuring a link between the strata or else reinforcements ensuring a lateral holding of the assembly.

The thickness of the strata depends on the nature of the material based on which these are formed and on the required mechanical properties. Typically, when the strata are made of a metal such as aluminum, it is possible to provide for a stratum thickness in the range of 0.1 mm or more.

In particular, the mold 1 may have been formed by a "Stratoconception®" type process as described for example in the document FR2673302, WO00/31599 or in the documents WO2004/034165A1, WO2006/128983.

In this type of process, we start from a digital model of the mold in the form of an exchange file obtained from a computer-aided design file, for example in a STL (standing for "Stereo-Lithography") format, commonly used in Additive Manufacturing software.

Using suitable software, for example the Stratoconcept® software, a decomposition of the model of the mold into a series of elementary models of elementary parts is generated. The decomposition may be carried out through computation and by selecting for example as input parameters for a user: the decomposition plane(s) defined in particular by slicing axes, the decomposition pitch(es), as well as the technique for assembling the elementary parts.

Starting from the elementary models, the elementary parts are individually manufactured afterwards, for example through a 3D material cutting technique such as laser cutting, micro-milling machining, or any other cutting technique or else by molding.

Afterwards, the manufactured elementary parts are assembled in order to reconstitute the mold. In particular, a secure holding of the parts may be achieved by means of a technique selected amongst the following non-limiting techniques: gluing, screwing, soldering, diffusion welding, Hot Isostatic Pressing (HIP), molding. It is also possible to assist fastening or implement this fastening of the elementary parts using leadthrough holding elements such as inserts or external holding elements such as reinforcements or holding bridges arranged over lateral edges of the strata stacking.

Figure 3:
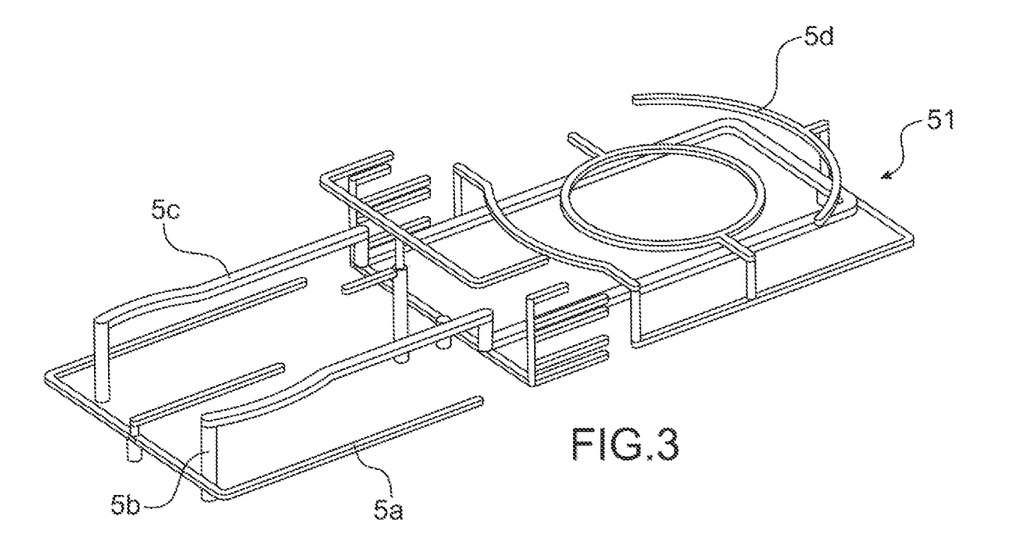
FIG. 3 serves to illustrate a fluidic network integrated into the mold and provided with channels formed in strata and in passages between strata of the assembly.

The assembly of the mold 1 into elementary strata allows facilitating making of one or several fluid circulation channel(s) or vent(s), with various directions, the channels may form a set making at least one fluidic network which extends in the assembly. An example of such a network 51 is illustrated in FIG. 3, and includes channels 5a, 5c, 5b located at different levels of the set of strata, some horizontal channels 5a, 5c extending in the illustrated example substantially parallel to the base 2, whereas one or several vertical channel(s) 5b may be intended to connect in pairs horizontal channels 5a, 5c located in different planes.

The channel(s) may be formed at least partially by holes or trenches crossing one or several stratum(strata) and/or indentations or nozzles provided at the upper or lower face of a stratum, or else at the lateral face of one or several stratum(strata). The assembly of the mold into elementary strata also allows making channels 5*d* with particular shapes and in particular featuring one or several curvature(s). The channels network 51 may include a first circuit or set of channels serving to achieve a thermal regulation of the mold as well as a second circuit or set of channels allowing achieving a depressurization at one or several point(s). For example, such a depressurization is implemented when the material to be formed is a polymer material sheet that is desired to pack against the mold 1 in order to conform to the shape of the receiving surface.

In particular, in order to enable monitoring of a molding and in particular thermoforming process implemented using the mold 1, this mold 1 is instrumented using one or several sensor(s) allowing measuring a physical quantity. In particular, the mold 1 may be provided with at least one temperature sensor and/or with at least one pressure sensor integrated into the multi-strata assembly, and in particular located between two strata of this assembly. Making of the mold 1 into elementary strata advantageously allows achieving the integration of sensors without any drilling. Hence, it is possible to provide for a plurality of sensors without weakening the mold 1. When the mold 1 is provided with a fluidic network, such a sensors integration is also achieved without risking altering this network.

In the assembly example illustrated in FIG. 2, the measuring structure is formed by a support (schematically represented by a plane Pi) provided with sensors and which extends between two stacked strata 1.3, 1.4. Thus, a first stratum 1.4 includes a lower face 33 (not shown in FIG. 2) against which the measuring structure extends and an upper face 31, opposite to the lower face 33 and provided with a region 32 forming a surface for receiving 31 the material to be molded or thermoformed, also called "molding surface". Thus, the measuring structure is arranged on a second stratum 1.3 located just beneath the first stratum 1.4 intended to be in contact with the material to be molded. Hence, the temperature and/or pressure sensor(s) are herein placed the closest to the material receiving surface, typically at a distance from the receiving surface close to the thickness of a stratum, this thickness may be smaller than 5 mm. Detection is carried out the closest to the material/receiving interface which allows achieving a more accurate monitoring of the thermoforming process. In order to improve the measurement accuracy, it is possible to provide several pressure and temperature sensor(s) beneath the receiving surface of the mold, in particular according to a meshing or a matrix-like layout of sensors.

Advantageously, the sensors are integrated into a flexible support 102, in other words a soft support prone to enable it to conform to a non-planar shape, in particular so as to be able to conform to a radius of curvature smaller than 2.5 mm.

The flexible support 102 is made of an elastic material typically based on a polymer material such as polyethylene naphthalate (PEN). The support 102 has a thickness e which may be comprised for example between 0.05 mm and 1 mm, preferably between 0.1 mm and 0.3 mm, for example in the range of 250 µm. Such a support 102 conforms to various non-planar topographies and can thus adapt to a mold having a material receiving surface with a complex shape.

Figure 4:
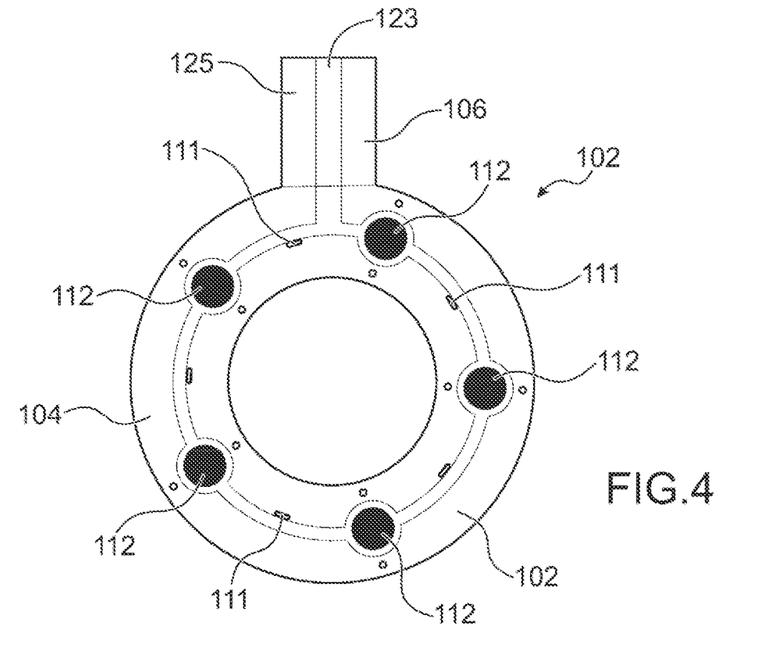
FIG. 4 serves to illustrate an example of a flexible support integrating one or several measuring sensor(s) and which is adapted to be inserted between elementary parts of a mold formed by an assembly of elementary parts.
Figure 5:
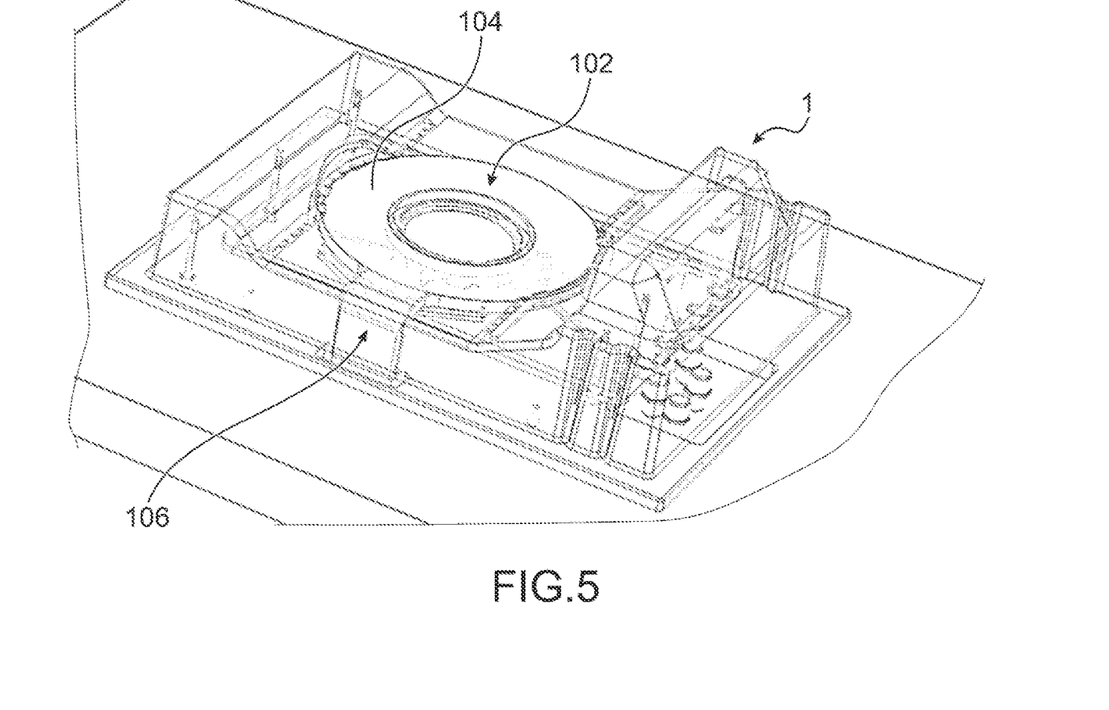
FIG. 5 serves to illustrate an example of a detection area of the flexible support provided with sensors and replicating the shape of a receiving region of the mold.

In the embodiment illustrated in FIGS. 4 and 5, the flexible support 102 provided with sensors includes a detection area 104 with a particular shape, in this instance annular, which substantially corresponds to the shape of a material receiving area 3*b* of the mold 1.

In this example, the detection area 104 is provided with both pressure sensors 112, and temperature sensors 111 distributed according to a determined pitch over the annular region. The sensor(s) as well as conductive tracks 123, 125 for connecting the sensors, may be formed at least partially by a conductive ink deposited for example using a silkscreen printing, or inkjet technique, on the flexible support typically made of a polymer material. Sensors made with such a technique have a reduced size. For example, the sensors 111, 112 are formed by an epoxy paste type conductive ink charged with silver particles. For example, the temperature sensor 111 may be made as in the document "Temperature sensor realized by inkjet printing process on flexible substrate", M.d. Dankoco, G. V. Tesfay, E. Benevent, M. Bendahan, Materials, Science & Engineering B, 205 (2016) 1-5], whereas the pressure sensor 112 may be formed for example in the manner described in the document "Low-Cost Thin and Flexible Screen-Printed Pressure Sensor", Daniel Gräbner, Marcel Tintelott, Gerrit Dumstorff and Walter Lang, Proc Eurosensors, 6, (2017), 616.

Positioning of the detection area 104 and of the sensors 111, 112 with respect to the fluidic network 51 and to the relief of the assembly, is typically planned during the digital modeling of the mold, for example using a specific module of a software tool as mentioned before.

Figure 6:
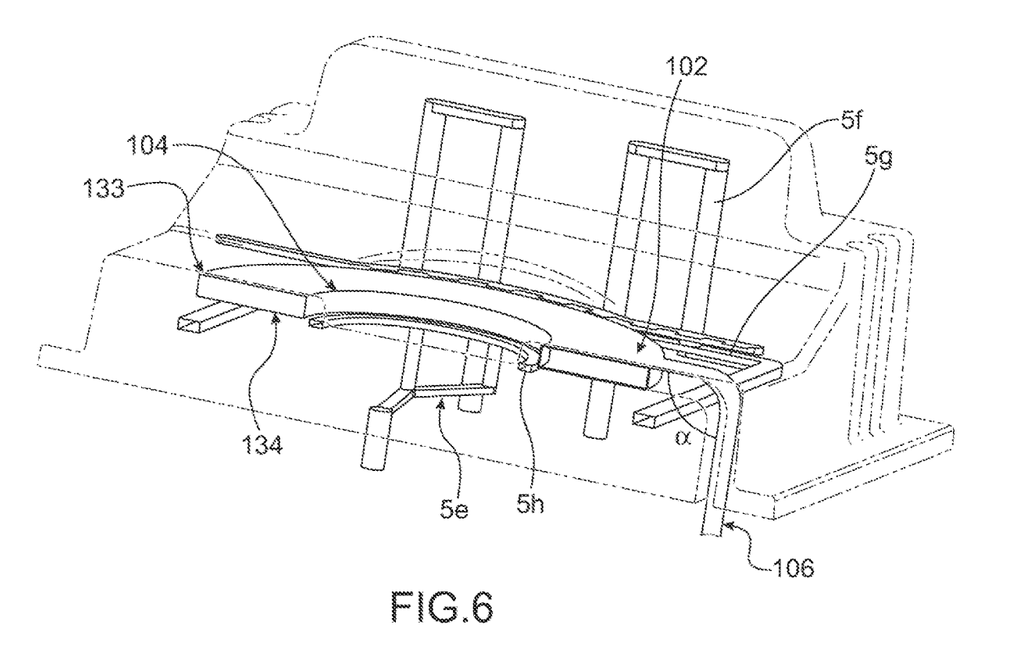
FIG. 6 serves to illustrate an example of an arrangement of a connection area of the flexible support allowing transmitting signals originating from the sensors out of the mold.
Figure 7:
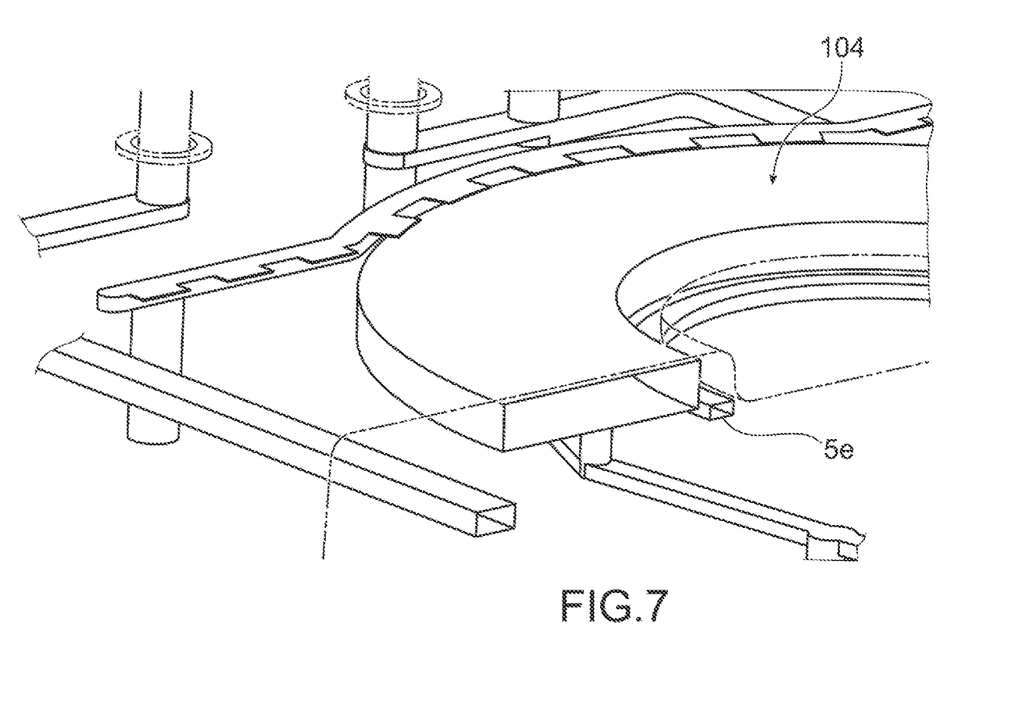
FIG. 7 serves to illustrate a particular arrangement of an active area of the flexible support.

In the embodiment illustrated in FIGS. 6 and 7 providing a partial perspective view of the instrumented mold 1, the annular-shaped detection area 104 is positioned according to the arrangement of cooling channels 5*e*, 5*f*, 5*g*; and is provided in this particular example around a circular-shaped fluidic channel 5*h*.

In order to enable capture of signals originating from the sensors of the detection area 104 towards a processing electronic circuit, it is possible to provide for one connection area of the flexible support integrating one or several conductive track(s), to be curved and define a non-zero angle α, in the illustrated example in the range of 90°, with said detection area 104.

In the illustrated case where the detection area 104 of the flexible support 102 is located beneath and against a stratum called first stratum (whose lower face is represented by a line 133) and a stratum called second stratum (whose upper face is represented by a line 134), the connection area 106 extending in the assembly against a lateral face of this second stratum. Such a curved shape of the connection area 106 allows facilitating a transmission of signals originating from the sensors out of the mold and for example towards a processing circuit which may be located beneath the base 2 of the mold 1.

Figure 8A:
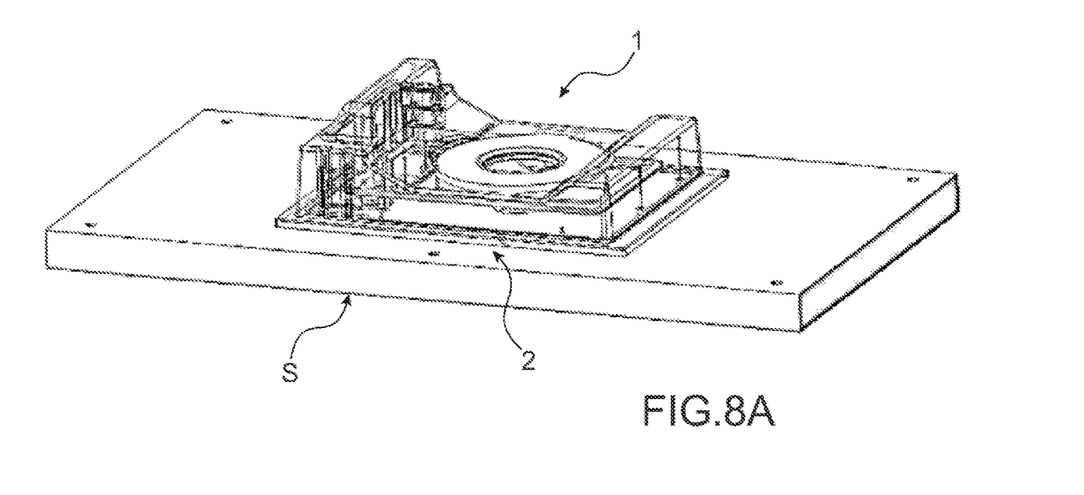
Figure 8B:
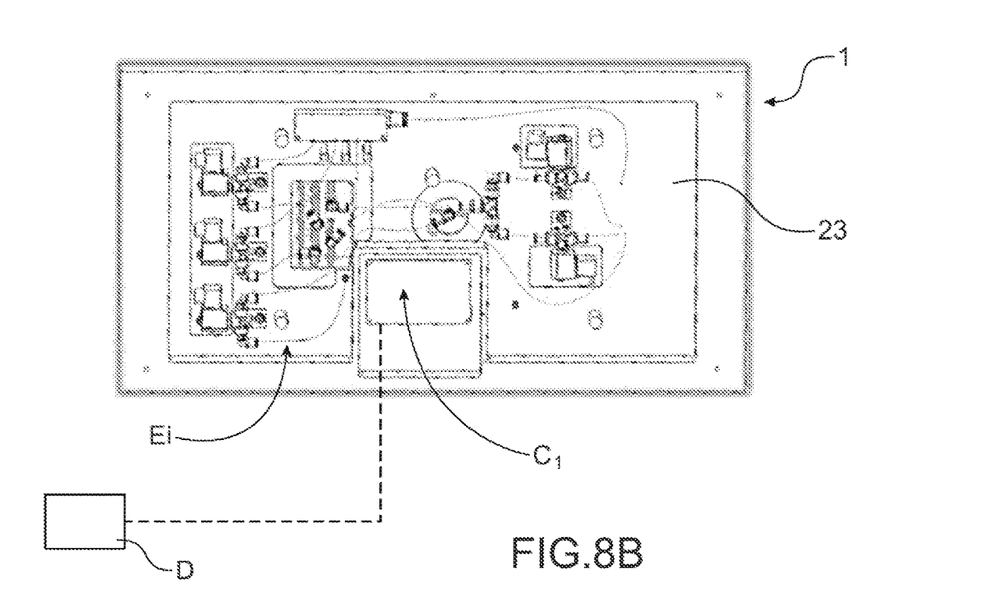

In the example illustrated in FIGS. 8A-8B respectively providing a perspective view of the mold 1 disposed on a support S and a bottom view of the mold 1, a cavity 23 being provided at the base 2 of the mold 1 to allow accommodating an electronic circuit C1. Typically, the electronic circuit C1 accommodated within the cavity 23 is provided with a stage for processing the signals originating from the sensor(s), for example with signals shaping, amplification, filtering, analog-to-digital conversion functions. Advantageously, the electronic circuit C1 is also provided with a stage for driving Ei actuators, in particular electric actuators of one or several fluid servovalve(s) in the aforementioned fluidic network. Typically, the electronic circuit C1 is in the form of a board. The fluidic network may include a cooling network, in which water flows for example, and a suction network. The suction network may open at the surface and assist in packing the formed material on the mold.

Instrumenting the mold 1 allows ensuring a better monitoring of the shaping process. Thus, the mold instrumented and associated to the electronic circuit C1 can form an active and autonomous set capable of acting on the molding conditions. Some parameters, in particular of the fluidic network for cooling the mold 1, can be adapted according to the measurements of the sensors for example using driver software integrated into the electronic circuit C1. It is also possible to act on the parameters of the suction network and to modify this suction in order to act on packing of the material to be molded.

Through this software, it is also possible to establish a communication between the mold 1 and an external device, in particular a production machine.

Besides a dynamic driving of the parameters of the molding process (for example by monitoring the temperature, driving the heat-transfer fluid or air valves, driving vacuum valves) according to measurements performed by the integrated sensor(s), an instrumentation of the mold 1 may also be provided in order to ensure supervision of the characteristics of the latter. Thus, measurements originating from the mold 1 may be intended or transmitted to a device for remote-maintenance of the mold to enable supervision, possibly remotely, of the evolution of the physical parameters of the mold 1, including the deformation by inserting strain sensors or gauges. The strain sensors may be made in a technology identical to that of the pressure sensors, only reading of the value measured by the sensor then being different.

In particular, a supervision of the workload plan of the mold, its occupancy rate, its location, its service life by collecting measurements originating from the sensor(s) may be operated. It is possible to exploit measurements data originating from the sensors for mold maintenance purposes and to supervise possible deviations.

The processing electronic circuit C1 which, in this example, is accommodated beneath the instrumented mold 1 may be associated to an external digital control device D of production machines or else be connected to an external network, for example via wireless links allowing monitoring the mold remotely. Such a system may allow improving the management of the tooling available within a factory.

Alternatively to the embodiment, the detection area 104 is arranged on one stratum 1.3 amongst said strata.

Figure 9:
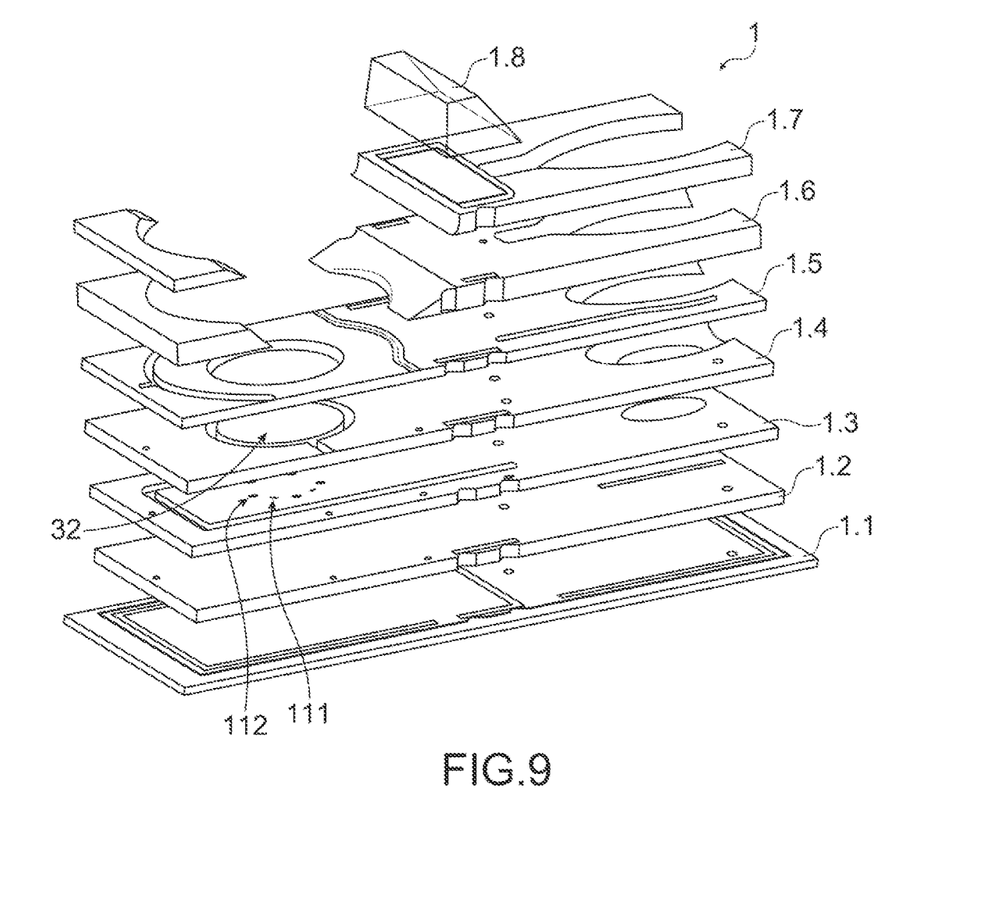
FIG. 9 provides an exploded view of a variant of an instrumented mold formed by an assembly of strata and provided with sensors made directly on a stratum.

An assembly variant is illustrated in FIG. 9 and in this instance provides for the integration of a detection area directly on a stratum of the stratified mold 1.1, 1.2, 1.3, 1.4, 1.5, 1.6, 1.7, 1.8. For this variant, the mold 1 thus integrates sensors for measuring physical parameter(s), in particular pressure and/or temperature on a face of a stratum 1.3. In this case, for example, the sensor(s) may be made by printing or by silk-screen printing on this stratum or using a technique similar to that previously described for the flexible support. Hence, a detection area is herein formed directly on the surface of a stratum, without necessarily having to machine the latter to accommodate a sensor therein within the thickness thereof.

A stacking of strata with at least one functionalised stratum at the surface with sensors made in particular by silks-screen printing or printing has a size smaller than another type of arrangement in which a flexible sensor is inserted into an inter-strata space and which is embedded for example into a glue serving to bond two strata together. Sensors made by silk-screen printing or printed at the surface of a stratum are also less intrusive as they are directly integrated into the structure of the mold. Typically, a sensor made by printing or silk-screen printing, with a thickness that may be in the range of several micrometers and for example smaller than 5 μm, whereas a discrete sensor that is inserted into an inter-strata space may have a thickness in the range of one millimeter with its coating or its case.

Making the sensors directly on one stratum allows for a distribution of multiple sensors with reduced pitches and for an accurate positioning thereof. With silk-screen printing and printing techniques, a detection area with a reduced thickness is also obtained, which limits the size and the impact on the design constraints of the stratum.

Moreover, this allows for an accurate positioning of the sensors, which leads to a better accuracy of the measurements performed by the detection area. Advantageously, the positioning of the sensors may be selected for example according to the result of a digital simulation of the industrial process intended (injection, thermoforming, . . . ) for the mold. With such a variant where a detection area is directly integrated onto a stratum, the connection with a signals processing circuit external to the mold may be achieved by means of conductive elements such as "vias" crossing the assembly and opening onto one or several outer face(s) of the mold. A connector integrated onto an outer face of stratum (strata) or glued on this face may also be provided.

The invention claimed is:

1. A mold, comprising:
at least one imprint over which a material is intended to be disposed to conform to the imprint; and
a material receiving surface, wherein
the mold is formed by an assembly of a plurality of strata,
said mold integrates, within the strata assembly, at least one measuring sensor,
said at least one sensor is integrated at a detection area,
the detection area is arranged between at least one first stratum amongst said strata and at least one second stratum amongst said strata,
said first stratum is disposed over said second stratum,
the detection area is arranged on a flexible support or on a stratum amongst said strata,
the strata assembly includes a base opposite to said receiving surface,
said base is provided with a cavity for accommodating an electronic circuit, and
a connection area further extends under said base and is arranged so as to connect at least one of at least one conductive track to a conductive element of said electronic circuit.

2. The mold according to claim 1, wherein:
said detection area is arranged against a lower face of said first stratum,
said lower face is opposite to an upper face of said first stratum,
said upper face of said first stratum forms at least one region of said material receiving surface,
said at least one sensor is disposed beneath the material receiving surface, and
said at least one sensor of said detection area is printed on a surface of said second stratum or said flexible support.

3. The mold according to claim 1, wherein the at least one sensor is arranged on a surface of said at least one second stratum without crossing a thickness of said at least one first stratum therethrough.

4. The mold according to claim 1, wherein the detection area is arranged on the flexible support, the flexible support includes at least one connection area integrating at least one conductive track connected to said at least one sensor, said connection area defines a non-zero angle with said detection area, and said connection area extends against a lateral face of said second stratum.

5. The mold according to claim 1, wherein said electronic circuit is provided with at least one stage for driving at least one servovalve of at least one fluidic network, and the fluidic network is provided with at least one channel extending in the strata assembly.

6. The mold according to claim 1, wherein the flexible support is made of a polymer material.

7. The mold according to claim 1, wherein said at least one sensor is formed at least partially of a conductive ink.

8. The mold according to claim 1, further comprising at least one of at least one temperature sensor and at least one pressure sensor.

9. A method for making the mold according to claim 1, wherein the detection area is arranged on the flexible support, the method comprising:

providing a set of elementary parts each elementary part forming a stratum, and assembling the elementary parts, by interposing between two strata, at least one said flexible support such as a polymer support, the flexible support being provided with at least one of a temperature sensor and a pressure sensor.

10. A method for making the mold according to claim 1, wherein the detection area is arranged on the stratum, the method comprising:

providing a set of elementary parts each elementary part forming a stratum, at least one determined stratum being provided with at least one of a temperature sensor and a pressure sensor on one face, and assembling the elementary parts.

11. The method for making the mold according to claim 10, wherein said at least one of a temperature sensor and a pressure sensor is made by silk-screen printing or by printing directly on a surface of said determined stratum.

* * * * *